(12) United States Patent
Davie et al.

(10) Patent No.: US 6,752,024 B2
(45) Date of Patent: Jun. 22, 2004

(54) VALVE PACKING GLAND PRESSURE SENSING BY CAPACITANCE MEASUREMENT

(76) Inventors: Neil R. Davie, 146 Amelia La., Livingston, TX (US) 77351; E. Michael Coffey, 527 Bel St., Kemah, TX (US) 77565

( * ) Notice: Subject to any disclaimer, the term of this patent is extended or adjusted under 35 U.S.C. 154(b) by 104 days.

(21) Appl. No.: 10/191,090

(22) Filed: Jul. 9, 2002

(65) Prior Publication Data

US 2003/0033886 A1 Feb. 20, 2003

Related U.S. Application Data

(60) Provisional application No. 60/312,637, filed on Aug. 16, 2001.

(51) Int. Cl.[7] .................................................. G01B 7/16
(52) U.S. Cl. ....................................................... 73/780
(58) Field of Search ............................ 73/780, 862.337, 73/862.68

(56) References Cited

U.S. PATENT DOCUMENTS

| | | | | |
|---|---|---|---|---|
| 3,914,715 A | * | 10/1975 | Hubing et al. | 333/24 R |
| 4,641,107 A | * | 2/1987 | Kalokitis | 330/286 |
| 4,914,741 A | * | 4/1990 | Brown et al. | 257/668 |
| 5,757,146 A | * | 5/1998 | Carder | 315/505 |
| 5,907,102 A | * | 5/1999 | Hilton et al. | 73/777 |
| 5,944,970 A | * | 8/1999 | Rosenblatt | 204/416 |

* cited by examiner

Primary Examiner—Max Noori (57) ABSTRACT

A thin flat disk-like capacitive load sensor of layered sandwich construction having a central opening and a circular outer periphery for installation above a packing follower or beneath the packing follower or packing gland. The load sensor has a thin first and second insulating outer layer between which an inner layer is secured. The inner layer is formed of dielectric material having a known dielectric constant, a first face having at least one thin electrically conductive circular ring surrounding the central opening in coaxial radially spaced relation, and a second face having a thin electrically conductive circular ring surrounding said central opening in coaxial radially spaced relation. The inner and outer layers contain electrical conductors engaged with respective electrically conductive circular rings on the opposed faces that are adapted to be connected with an electrical measurement apparatus. As the inner layer is compressed the spacing between the electrically conductive rings on the opposed faces is decreased such that compressive force on the packing can be measured as a function of the change in capacitance of the sensor. Proper compression of the padding can be achieved by monitoring during installation. Follow-up sampling or continuous measurement of packing compression provides early detection prior to packing failure to allow corrective action.

17 Claims, 8 Drawing Sheets

VALVE PACKING GLAND PRESSURE SENSING BY CAPACITANCE MEASUREMENT

CROSS-REFERENCE TO RELATED APPLICATION

This application claims priority of U.S. Provisional Application Serial No. 60/312,637 filed Aug. 16, 2001.

FIELD OF THE INVENTION

The present invention relates generally to valve packing gland load sensing and monitoring devices, and more particularly to a sensor arrangement associated with a packing gland providing for monitoring of the valve packing gland compression load.

BACKGROUND OF THE INVENTION

Packing glands are used in many commercial, industrial and consumer applications to provide a conformable sealing member around a movable shaft or stem inserted through a cylindrically shaped cavity of larger diameter, generally called a stuffing box. A compressive load is typically created by an axial force applied by a packing gland or follower to conform the inner diameter of the packing to the outer diameter of the movable shaft or stem and the outer diameter of the packing to the inner diameter of the stuffing box so as to form a sealing relation therebetween. Proper product installation and loading of the packing is necessary for a lasting seal to be effected. Critical packing applications may contain liquids, gases or solids where leakage could lead to emissions with dramatic effect to safety or to the environment. Known applications include containing volatile organic compounds such as gasoline and carbolic acid, carcinogenic products such as benzene and toluene and poisonous products such as chlorine, phosgene, hydrogen cyanide and ammonia. Critical seal application likewise contain insecticide and defoliant products and suspected ozone depletion gases such as chlorinated hydrocarbons. The critical nature of the packing seal in these and many other applications is such that an improved method of installation and verification of packing integrity over time is paramount for safety, process control and as a deterrent to fugitive emissions and maintenance downtime.

Common causes of packing failure in equipment such as valve packing glands, pumps, compressors, probes, etc. can be from improper loading, over or under tightening of glands and misalignment of the shaft or stem. Too much compression can lead to excessive friction and premature wear, while too little compression can lead to premature leakage. Shaft or stem misalignment can lead to all the above problems. Packing integrity can change by over pressuring, surging, flashing, excessive temperature and combinations thereof by the material flowing through the valve packing gland. Such occurrences may cause over compression of the packing inside the stuffing box creating a leakage path even when springs are used to maintain compression. Changes in packing compression may also cause control valve packing glands to stick and slip resulting in unbalancing process control. Pumps, compressors, probes, mixers, etc. can also suffer from initial improper packing integrity and changes over time which result in unwanted emissions, safety issues, maintenance downtime and loss of production.

Therefore, it would be desirable to provide a packing sensor that would insure packing integrity and provide a correct, ongoing measure of the conditions known to be factors affecting packing performance with minimal variations from tolerances, environmental variations or other factors unrelated to packing failure mechanisms.

SUMMARY OF THE INVENTION

The present invention provides a valve packing gland load sensor and monitoring system that determines loading based upon a measurement of the capacitance of sensor capacitor that is associated with a packing gland or follower. The monitoring of valve packing gland compression load can be made during installation and/or sampling or continuous measurement of packing compression to provide early detection and corrective action prior to packing failure.

A thin flat disk-like capacitive load sensor of layered sandwich construction having a central opening and a circular outer periphery is installed above a packing follower or beneath the packing follower or packing gland. The load sensor has a thin first and second insulating outer layer between which an inner layer is secured. The inner layer is formed of dielectric material having a known dielectric constant which does not change when subjected to compression, a first face having at least one thin electrically conductive circular ring surrounding the central opening in coaxial radially spaced relation, and a second face having a thin electrically conductive circular ring surrounding the central opening in coaxial radially spaced relation. The inner and outer layers contain electrical conductors engaged with respective electrically conductive circular rings on the opposed faces that are adapted to be connected with an electrical measurement apparatus. As the inner layer is compressed, the spacing between the electrically conductive rings on the opposed faces is decreased such that compressive force on the packing can be measured as a function of the change in capacitance of the sensor. Proper compression of the packing can be achieved by monitoring during installation, and sampling or continuous measurement of packing compression provides early detection prior to packing failure to allow corrective action.

The valve packing gland load sensor capacitor and monitoring system of the present invention improves packing integrity and affords a correct and accurate ongoing measure of conditions known to be factors affecting packing performance with minimal variations from tolerances, environmental variations or other factors unrelated to packing failure mechanisms. The system can detect and monitor for proper packing load, ongoing process influences, and show the trends of these dynamics to allowing early detection of sealing and or process problems. The system is suitable for use in a wide range of environments and conditions in which the packing may be used, including large temperature and pressure variations and corrosive applications. The system is easily and quickly installed in conventional valve packing gland assemblies without special tools, and does not require modification of existing equipment.

DESCRIPTION OF THE PREFERRED EMBODIMENTS

Figure 1:
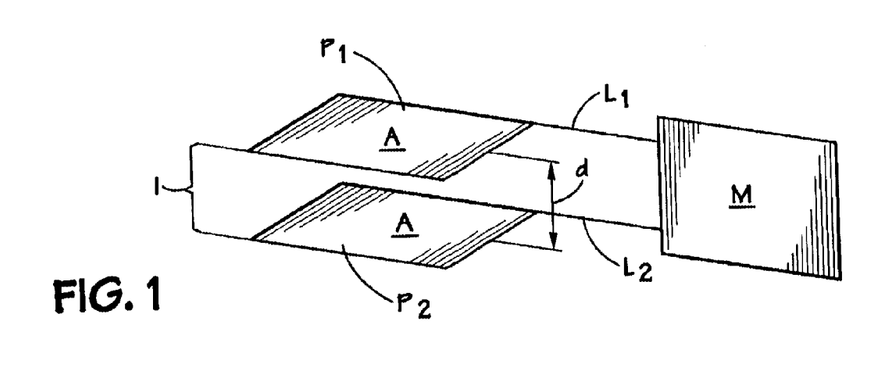
FIG. 1 is a schematic illustration of a parallel plate capacitor arrangement that provides the basis for the capacitive valve packing gland load sensor of the present invention.

As shown schematically in FIG. 1, a capacitor can be formed in its simplest form by providing two parallel plates P1 and P2 of equal area "A" formed of a metallic conductor with a dielectric material 1 between the plates, which has a dielectric constant "K". The dielectric constant for air is unity, or 1.0. Thus, the ratio of the capacitance "C" achieved with like spacing and area using an insulator other than air has a dielectric constant "K" that is greater than air (1.0). The parallel plates P1 and P2 area are shown connected via leads L1 and L2 to a measuring device M. The commonly known equation for capacitance is:

$$C = \frac{.224KA(n-1)}{d}$$

where:

A=the area of the smallest parallel plate in square inches

K=the dielectric constant of material between plates d=spacing between plate surfaces in inches, and n=number of plates.

From this relationship, it can be seen that the distance "d" can be readily determined by a measure of the capacitance if area "A" and dielectric constant "K" are fixed. Therefore, the amount of packing compression achieved at the capacitive sensor location can be determined for a particular configuration by controlling, within acceptable tolerances, the area "A" and dielectric constant "K". The area "A" can be effectively made and maintained at very close tolerances during manufacture of a sensor device by conventional etching operations commonly used in flexible circuitry construction. The electrical conductors for connecting the leads of such a sensor device to the measuring device are also preferably narrow etched areas.

Figure 2:
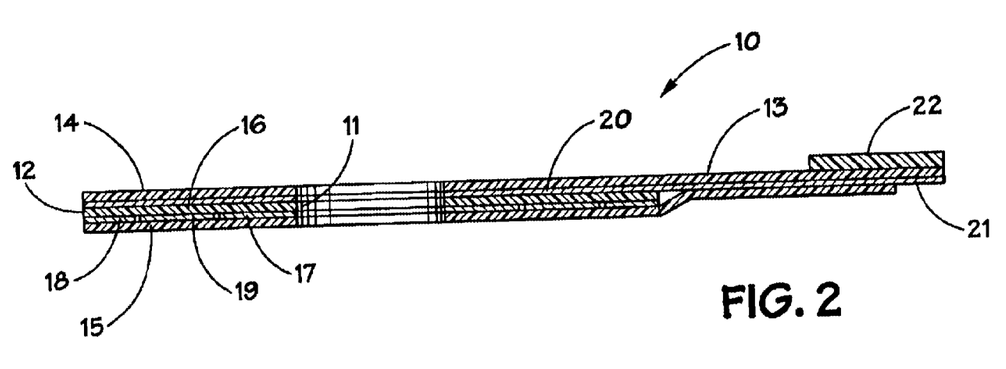
FIG. 2 is an enlarged transverse cross section through a capacitive valve packing gland load sensor illustrating the metallic and dielectric layers of the sensor.
Figure 3:
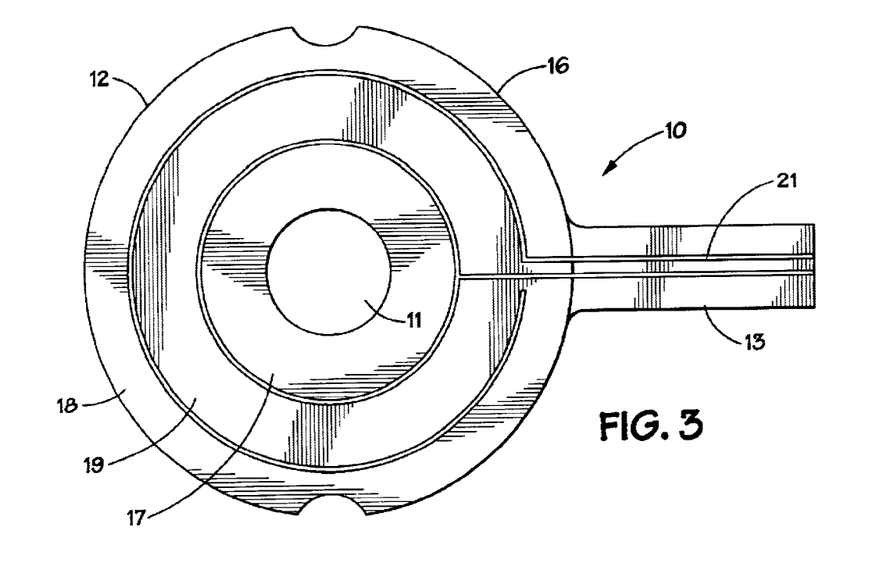
FIG. 3 is a plan view of one face of the inner dielectric layer of a capacitive valve packing gland load sensor without the outer dielectric layer to illustrate a typical sensor pattern configuration.
Figure 4:
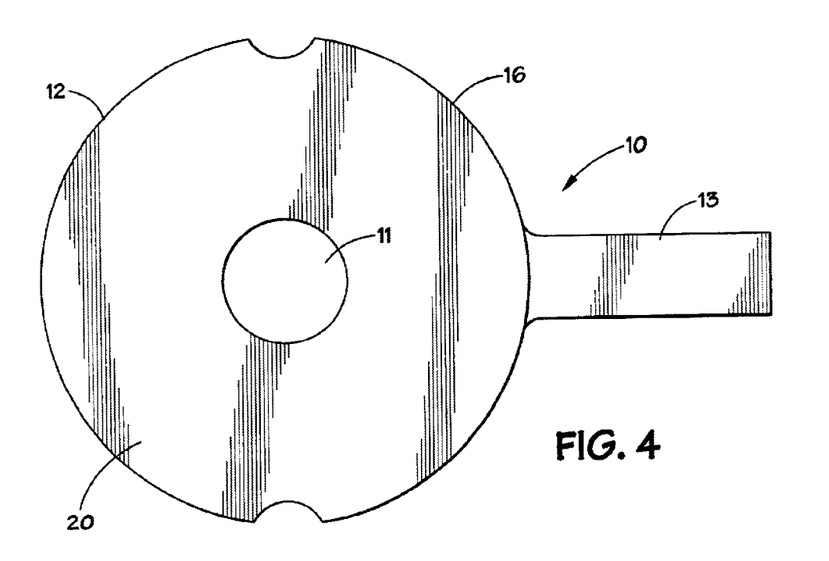
FIG. 4 is a plan view of the large metallic area on the opposite face of the inner dielectric layer to that of FIG. 3.

Referring now to FIGS. 2, 3 and 4, a valve packing gland load sensor 10 is illustrated. The load sensor 10 may be adapted for installation above a packing follower in a conventional bolt-down type packing arrangement. The load sensor 10 is a capacitor. Load sensor 10 has a flat, disk-like configuration having a central bore 11. The circular outer peripheral edge 12 is provided with a rectangular tab portion 13 extending radially from the peripheral edge. The load sensor 10 is of a layered sandwich construction with a first outer layer 14 and a second outer layer 15, between which an inner layer 16 is secured. The outer layers 14 and 15 are formed of a thin flexible insulating material, such as polyamide or polyester of the type commonly used for flexible circuitry construction. The outer layers 14 and 15 may each be, for example, 2-mils in thickness. The inner layer 16 is formed of a dielectric material selected to have a known dielectric constant within acceptable bounds for the particular application. One such material is Teflon (PTFE). Layer 16 may be somewhat thicker than the outer layers such as, for example, 4-mils in thickness. The outer layers 14 and 15 each have a generally rectangular tab portion that extends radially beyond the peripheral edge of the inner layer 16. These tab portions form the rectangular tab portion 13 of the load sensor 10.

As shown in FIG. 3, one surface or face of the inner layer 16 is provided with a thin flat inner circular ring 17 of electrically conductive metallic material which surrounds the central bore 11 in coaxial radially spaced relation. A thin flat circular outer ring 18 of electrically conductive metallic material surrounds the inner circular ring 17 in coaxial radially spaced relation. A thin flat circular intermediate ring 19 of electrically conductive metallic material is disposed in the area between the inner and outer circular rings 17 and 18 in coaxial radially spaced relation. As shown in FIG. 4, the other surface or face of the dielectric inner layer 16 is provided with a relatively wide thin flat circular ring of electrically conductive metallic material 20 which surrounds the central bore 11 in coaxial radially spaced relation. The patterns of the metallic circular ring areas can be effectively made and maintained at very close tolerances during manufacture by conventional etching operations commonly used in flexible circuitry construction.

Electrical conductors or leads 21 are embedded in the thin flexible insulating outer layer 14 and each is joined at an inner facing end, during assembly, to a respective sensor. The conductors or leads 21 extend longitudinally along the rectangular tab portion 13 to the distal end of the rectangular tab portion. The ends of leads 21 are configured for electrically connecting the respective rings to an electrical measurement apparatus. The electrical conductors or leads are also preferably formed by conventional etching operations commonly used in flexible circuitry construction. A generally rectangular stiffener 22 (FIG. 2) may be secured to the surface of the tab portion 13 opposite the surface containing the leads 21 to facilitate connection of the leads to a connector connected with the measurement apparatus. The outer layer 14 serves as an insulated base or backing to hold the etched metallic areas together, and are attached to the inner layer 16 with adhesive and pressure.

Figure 5:
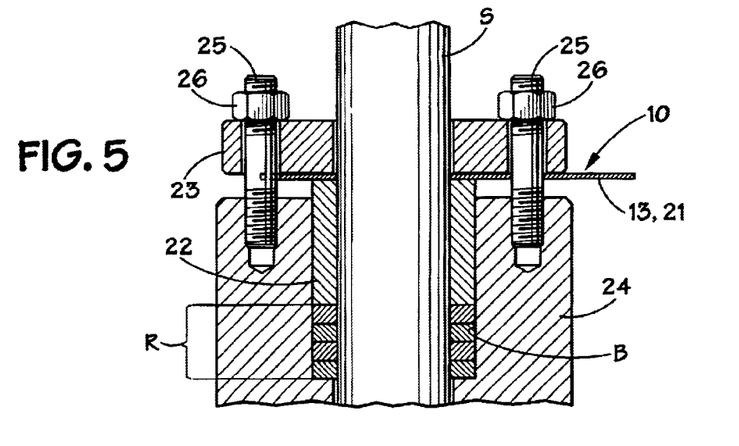
FIG. 5 is a longitudinal cross section of a capacitive valve packing gland load sensor illustrating the sensor installed above the packing follower in a bolt-down type packing arrangement.

Referring now to FIG. 5, valve packing gland load sensor capacitor 10 is shown installed in a typical bolt-down type packing arrangement. In a typical bolt-down packing arrangement, a valve packing gland stem S is surrounded by a plurality of stacked packing rings R disposed in a stuffing box B and are engaged by the bottom end of a packing follower 22. The packing follower 22 is pressed against the packing rings R by a flange 23 mounted on the valve packing gland bonnet 24 by a plurality of studs 25 and nuts 26. The packing rings R are compressed by tightening the nuts 26. This compresses the packing rings R to conform to the stem S and the stuffing box B in the bonnet 24 and thus forms a seal.

The load sensor 10 is installed between the bottom end of the flange 23 and the top end of the packing follower 22. The rectangular tab portion 13 of the load sensor 10 carrying the conductors or leads 21 extends outwardly between a pair of adjacent studs. The outer ends of the leads 21 are connected by a connector to the electrical measurement apparatus.

The width of the inner ring 17 (FIG. 3) is substantially the same width as the wall thickness of the packing follower 22, and resides within the area of packing gland applied compression. The rings 18 and 19 are disposed outside of the area of packing gland applied compression. The relatively wide metallic ring that serves as the reference plate 20 is disposed toward the underside of the flange 23 such that stray capacitance between the flange and the ring 19 will not occur. The bottom of the ring 18 is spaced from the surface of the valve packing gland bonnet 24 such that any stray capacitance to the bonnet would be very small.

The purpose of ring 19 is to provide a second, or common return connection for a two-connection capacitance measurement. Since the relative area is large in relation to the sensed area, its capacitance is not a significant factor in the measurement. Ring 18 and ring 20 form a reference capacitance. A circuitry path is formed with the capacitance from the ring 17 to the large metallic area 20 through the dielectric 16 in series with the larger capacitance from the large metallic area 20 through the dielectric 16 to the common return ring 19. The well-known formula for series capacitance is: $1/C\text{ total} = 1/C1 + 1/C2$. If one value of C1 or C2 were very large, the value of C total would be just the other value. In this case it is less dramatic, but the effect remains. The purpose is largely to simplify the connectivity of the load sensor.

The leads of the load sensor are connected to an electrical measurement apparatus, such as a portable personal computer having a display. The measurement apparatus provides a measure of the spacing between the metallic sensors separated by the dielectric and thus the packing compression. The measurement apparatus is also used to present the measured values in a manner most needed by an installer or monitoring personnel. Use of the conventional computer connectivity facilities, for example, a USB (Universal Serial Buss) allow the multiplicity of circuit nodes to be connected to the same input of a computer up to a total of 127. Power to the load sensor can be provided over the connecting cables of the USB. Further monitoring capability can be easily implemented using a modem or local area network connection from the computer to a centrally located monitoring station at a facility where continuous monitoring is desired. Use of an IEEE 802.11 b standard wireless local area network commonly found on laptop computers is an example of a means to facilitate such a central monitoring facility without the necessity for running interconnecting lines between units.

Tolerances in materials and measurement circuitry can result in error tolerance in some cases. For instance, over a wide temperature range some slight change of dielectric constant can occur in most materials. Additionally, some initial variations in dielectric thickness can result from adhesive thickness in manufacturing the layers that make up the sensor. In electrical circuitry, stray capacitance in measurement leads and semiconductor junction capacitance can lead to changes in value. Particularly with a digitised data collection mechanism, these errors can be partially cancelled out through a calibration measurement that can be applied to each measurement made. Over time and environmental conditions, however, such initial calibration can become less accurate as values of junction capacitance vary and materials properties change slightly.

Figure 6:
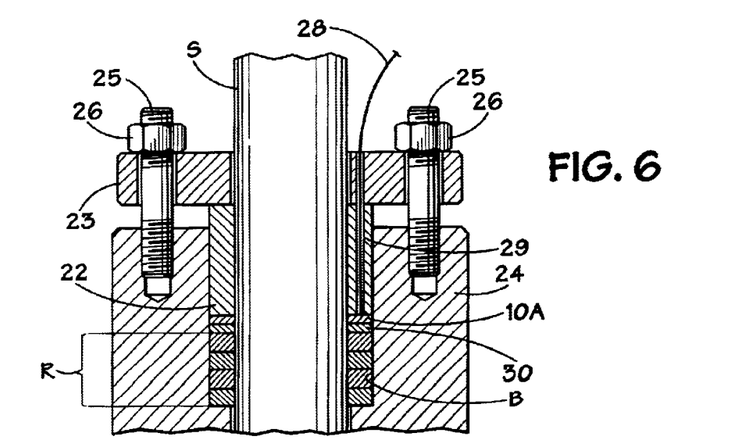
FIG. 6 is a longitudinal cross section of a capacitive valve packing gland load sensor illustrating the sensor installed beneath the packing follower in a bolt-down type packing arrangement.
Figure 7:
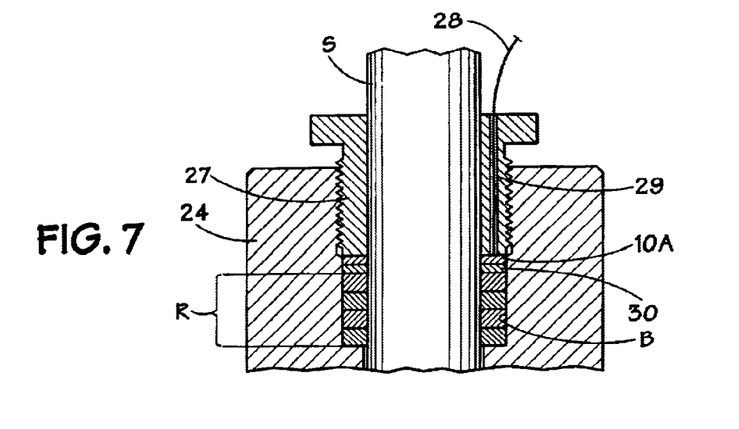
FIG. 7 is a longitudinal cross section of a capacitive valve packing gland load sensor illustrating the sensor installed beneath the packing gland in a screw type packing arrangement.

The packing gland load sensor may be provided without the thin flat circular outer ring 18 of electrically conductive metallic material that serves as a reference sensor, and without the outwardly extending rectangular tab portion. As shown in FIGS. 6 and 7, the load sensor 10A may be used between the packing rings R and the bottom end of the packing follower 22 or bottom end of a threaded packing gland 27.

In load sensor 10A, the electrical conductors or leads 21 that are embedded in the thin flexible dielectric top and bottom layers are joined at one end to a respective sensor and are positioned to be engaged by one end of electrical leads 28 that extend through an internal slot or bore 29 formed in the packing follower 22 or packing gland 27 which are connected at their outer ends to the electrical measurement apparatus. A protective washer 30 may also be installed beneath capacitive load sensor IOA to act as a barrier and thrust bushing between the sensor and the packing.

Figure 8:
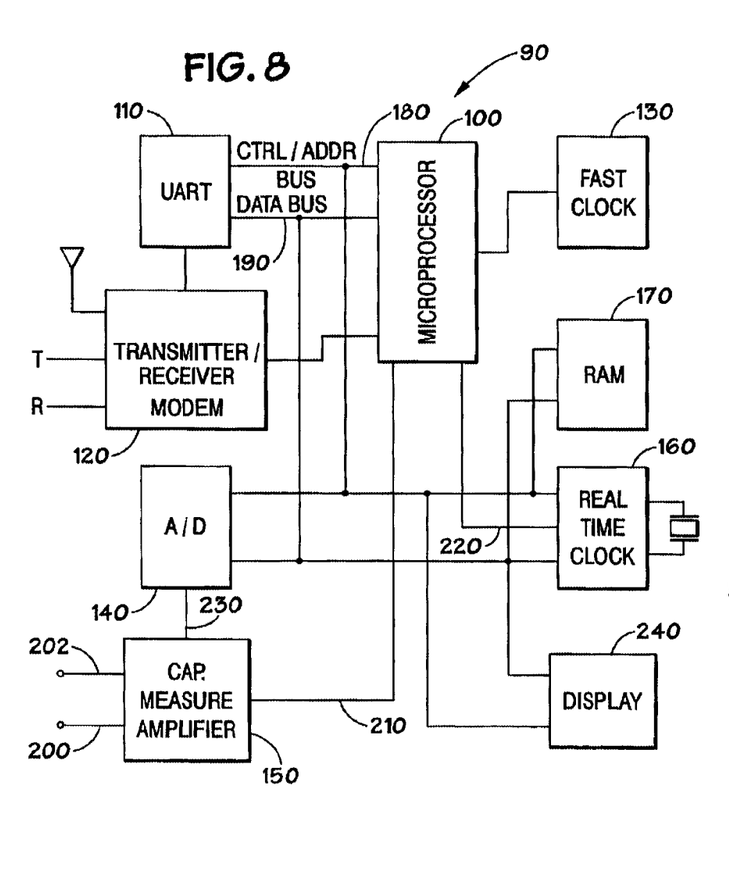
FIG. 8 illustrates a signal-processing instrument provided as a dedicated microprocessor-based unit with communications capability.

FIG. 8 shows a signal-processing instrument implemented as a dedicated microprocessor-based unit without all the capabilities normally provided by a personal computer. Such a signal-processing instrument can provide for valve packing gland integrity data collection, data storage, data display, and data transmission over a communication link. Instrument 90 includes conductors 200 and 202 for connecting to the capacitor plates of a valve packing gland arrangement shown in any of FIGS. 5, 6 and 7. The conductors connect the capacitor plates to a capacitance measuring circuit and amplifier 150. Circuit 150 may also be provided as a separate unit. The capacitance measurement is applied to an analog-to-digital (A/D) converter 140 coupled to data bus 190. Also, coupled to the data bus is microprocessor 100, RAM 170, display 240, UART 110, and real time clock 160. A control/address bus 180 also interconnects those components as shown. The UART 110 provides formatted data to a transceiver unit 120. The unit 120 includes a modem for connection to the tip (T) and ring (R) lines of a telephone circuit. Also, unit 120 includes a wireless communications capability over an antenna. Instrument 90 can be packaged as a portable, battery-powered unit for handheld operation by field personnel.

Figure 9:
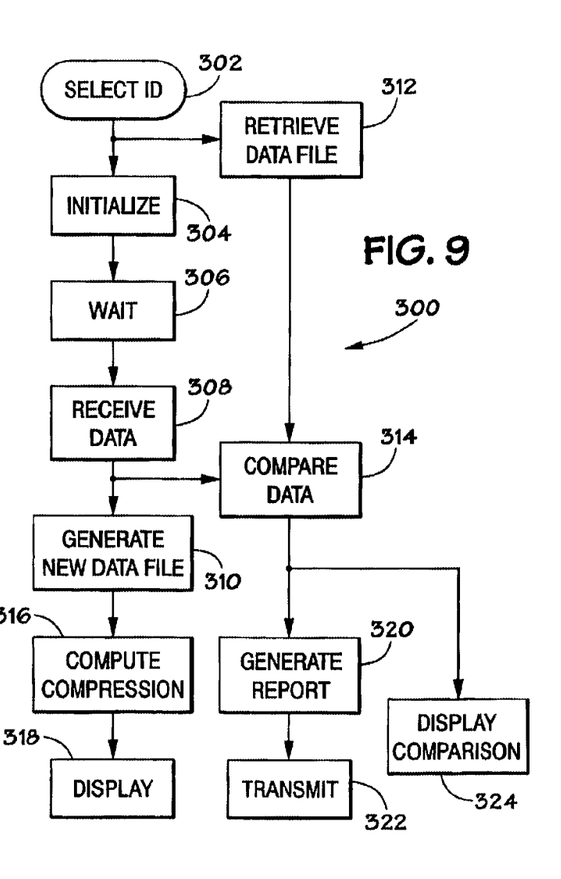
FIG. 9 illustrates a flowchart of the programmed functional operation of a personal computer or the signal-processing instrument of FIG. 8.

FIG. 9 shows a flowchart 300 for implementation as a software module. The flowchart illustrates the programmed operation of personal computer 82 and the signal-processing instrument 90. After an identification of the particular valve packing gland is made by the Select ID block 302, the capacitance-measuring instrument is initialized at block 304. Then, a period of time is allowed at Wait block 306 during which time the capacitance measurement is made. The data is received at block 308. The received data is used to create a new data file at block 310. If the valve packing gland has already been installed such that there is an existing data file, the file was retrieved at block 312 after the Select ID operation. The retrieved data is provided to a Compare Data block 314 which also is provided with the received data at block 308. After a new data file is generated, the valve packing gland compression is computed at block 316. This computation is done on the basis of the equation for capacitance from which the distance "d" parameter is derived. The distance "d" parameter is then used in accordance with a stored look-up table to determine the valve packing gland compression. The computed compression is displayed at block 318. The flowchart also shows that based upon the data comparison at block 314, a report is generated at block 320 and transmitted at block 322. Also, the data comparison is displayed at block 324. The circuitry of FIG. 8 may be conveniently packaged in a handheld device similar to a personal digital assistant (PDA) or a similar portable data entry instrument.

Figure 10:
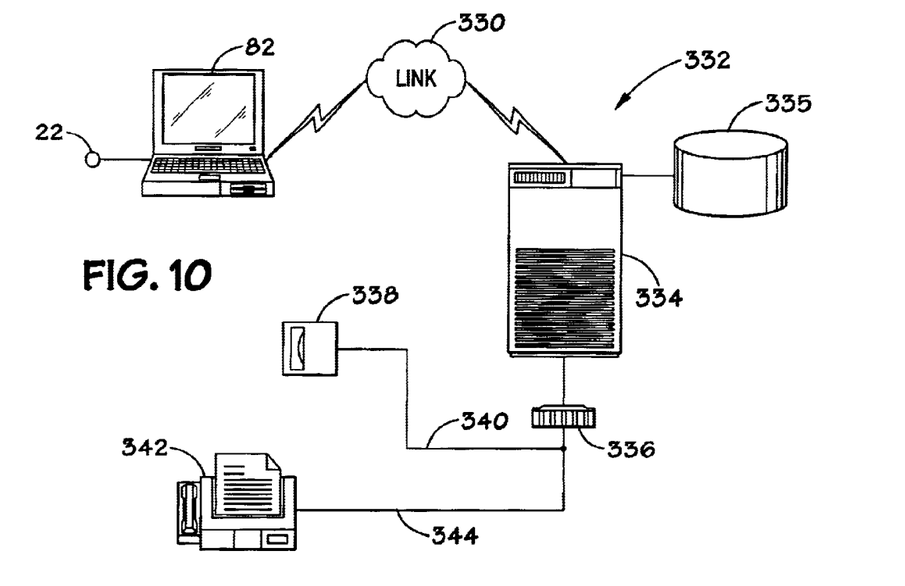
FIG. 10 illustrates a data communication link between a personal computer or the signal-processing instrument of FIG. 8 and a remote data center.

Through calibration of the capacitance-measuring instrument, a display of the measured capacitance signal can be provided on either a personal computer or instrument 90 of valve packing gland compression forces in predetermined units of measurement. The display can be used by a valve packing gland installer for guidance in properly installing the valve packing gland. Further, a data file record can be made of the valve packing gland installation parameters for archival purposes. Such a data file record can be transmitted over a communication link to a central data center. Such an arrangement is shown in FIG. 10. In addition, field maintenance personnel can use either a personal computer or instrument 90 to monitor valve packing gland integrity and performance during periodic maintenance. Such determination may be made by personnel in the field using a locally stored database or by transmission to a central monitoring station where the data is analyzed. In a bi-directional communications link between the field unit (personal computer or instrument 90) and a central monitoring station, valve packing gland performance data can be up-linked to the central monitoring station and instructions for adjustments to the valve packing gland installation can be returned to field maintenance personnel. Communications links such as a telephone line connection and a wireless telephone connection can be utilized. Further, a communication link over an Internet connection may be utilized.

FIG. 10 is a block diagram showing automated collection and analysis of valve packing gland compression information retrieved from a particular valve packing gland installation for remote monitoring. A valve packing gland (not shown) is connected to capacitance measuring instrument 22, which would be interfaced to a personal computer. As indicated in the flowchart of FIG. 9, capacitance measurement data for the valve packing gland is stored as a set of collected measures stored as data files for later retrieval. The data files are telemetered over a communication link 330 to the remote data center 332. The telemetered data files received at the data center are analyzed by server system 334, which includes a database 335. The feedback can then be provided back to the field personnel evaluating the valve packing gland through a variety of media. By way of example, the feedback can be sent as an electronic mail message generated automatically by the server system 334 for transmission over the communication link 330. The electronic mail message is received by a personal computer or instrument 90. Alternatively, the feedback can be sent through a telephone interface device 336 as an automated voice mail message to a telephone 338 over phone line 340 or as an automated facsimile message to a facsimile machine 342 over phone line 344, both also situated for local access by the field personnel. In addition to a personal computer, telephone 338, and facsimile machine 342, feedback could be sent to other related devices, including a network computer, personal data assistant, television, or digital data processor.

Figure 11:
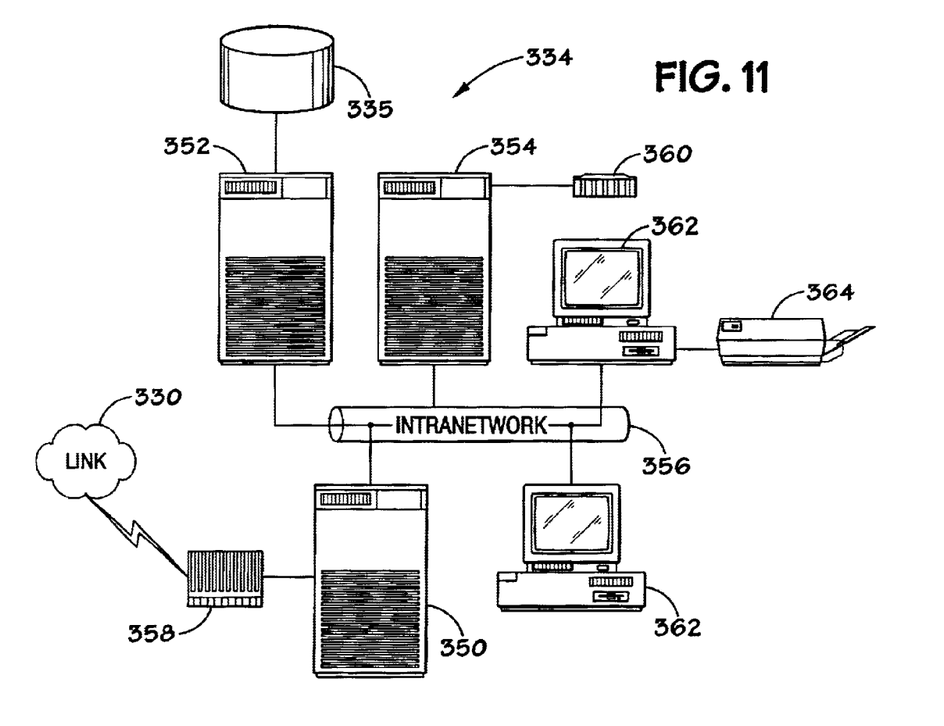
FIG. 11 illustrates the server system of the remote data center.

FIG. 11 is a block diagram showing the hardware components of the server system 334 of the system of FIG. 10. The server system 334 consists of three individual servers: network server 350, database server 352, and application server 354. These servers are interconnected via an intranetwork 356. In the described embodiment, the functionality of the server system 334 is distributed among these three servers for efficiency and processing speed, although the functionality could also be performed by a single server or cluster of servers. The network server 350 is the primary interface of the server system 334 to link 330. The network server 350 receives the collected data files that are telemetered from the field over link 330 as shown in FIG. 10. The network server 350 is interfaced to the link 330 through a router 358. To ensure reliable data exchange, the network server 350 preferably implements a TCP/IP protocol stack, although other forms of network protocol stacks are suitable.

The database server 352 organizes the data files in the database 352 and provides storage of and access to information held in those files. A high volume of data in the form of collected measures sets from individual valve packing glands is received. The database server 352 frees the network server 350 from having to categorize and store the individual collected measures sets in the data files. The application server 354 operates management applications and performs data analysis on the stored data files in developing valve packing gland integrity records. The application server 354 communicates feedback to the field personnel either through electronic mail sent back over the link 330 via the network server 350 or as automated voice mail or facsimile messages through the telephone interface device 360.

The server system 334 may also include a plurality of individual workstations 362 (WS) interconnected to the intranetwork 356, some of which can include peripheral devices, such as a printer 364. The workstations 362 are for use by the data management and programming staff, office staff, and other consultants and authorized personnel.

The database 335 consists of a high-capacity storage medium configured to store individual valve packing gland data files and related installation information. Preferably, the database 335 is configured as a set of high-speed, high capacity hard drives, such as organized into a Redundant Array of Inexpensive Disks (RAID) volume. However, any form of volatile storage, non-volatile storage, removable storage, fixed storage, random access storage, sequential access storage, permanent storage, erasable storage, and the like would be equally suitable.

The individual servers and workstations of the remote center are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 12:
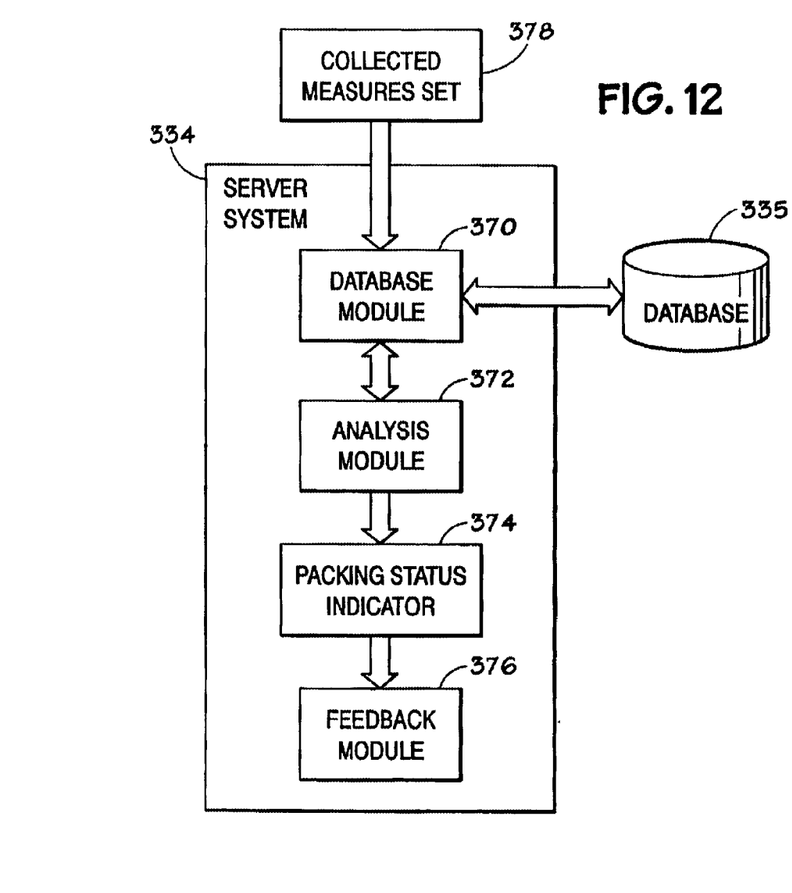
FIG. 12 illustrates the organization of the server system of the remote data center.

FIG. 12 is a block diagram showing the software modules of the server system 334 of the system of FIG. 10. Each module is a computer program written as source code in a conventional programming language, such as the C or Java programming languages, and is presented for execution by the CPU as object or byte code, as is known in the arts. The various implementations of the source code and object and byte codes can be held on a computer-readable storage medium or embodied on a transmission medium in a carrier wave. There are four basic software modules, which functionally define the primary operations performed by the server system 334: database module 370, analysis module 372, valve packing gland status indicator 374, and feedback module 376. In the described embodiment, these modules are executed in a distributed computing environment, although a single server or a cluster of servers could also perform the functionality of the modules.

For each valve packing gland being installed or monitored, the server system 334 periodically receives a data file comprising a collected measures set 378 which is forwarded to the database module 370 for processing. The database module 370 organizes the individual valve packing gland records stored in the database 335 and provides the facilities for efficiently storing and accessing the collected measures sets 378 and valve packing gland data maintained in those records. Any type of database organization can be utilized, including a flat file system, hierarchical database, relational database, or distributed database. The analysis module 372 analyzes the collected measures sets 378 stored in the valve packing gland data files of database 335. The analysis module 372 makes an automated determination of valve packing gland integrity in the form of a valve packing gland status indicator 374. Collected measures sets 378 are received from the field and maintained by the database module 370 in the database 335. Through the use of this collected information, the analysis module 372 can continuously follow the integrity of a valve packing gland over the course of its maintenance history and can recognize any trends in the collected information that might indicate a defect and warrant replacement. The analysis module 372 compares individual measures obtained from both the database records for the individual valve packing gland and the records for a specific group of valve packing glands.

The feedback module 376 provides automated feedback to the field concerning an individual valve packing gland based, in part, on the valve packing gland status indicator 374. As described above, the feedback could be by electronic mail or by automated voice mail or facsimile. In the described embodiment, four levels of automated feedback are provided. At a first level, an interpretation of the valve packing gland status indicator 374 is provided. At a second level, a notification of potential defect concern based on the valve packing gland status indicator 374 is provided. This feedback level could also be coupled with human contact by specially trained technicians or engineering personnel. At a third level, the notification of potential defect concern is forwarded to field personnel located in the geographic area of the valve packing gland installation. Finally, at a fourth level, a set of maintenance instructions based on the valve packing gland status indicator 374 could be transmitted directly to the field personnel directing them to modify the valve packing gland installation in some manner.

The functionality of the server system diagrammed in FIG. 12 can be provided in a software program resident on a personal computer. A database of valve packing gland data files would be stored on the hard disk of the computer or provided on a floppy disk or compact disk. The collected measures set processed from data obtained from the capacitance-measuring instrument would be analyzed by an analysis module to generate a valve packing gland status indicator. Feedback to the field maintenance personnel would be provided by a feedback module. The collected measures set could also be telemetered to the remote data center for archiving.

With the valve packing gland compression load sensor arrangements described herein, tolerances in materials and measurement circuitry can result in errors in some cases. For instance, over a wide temperature range some slight change of dielectric constant can occur in most materials. Additionally, some initial variations in dielectric thickness can result from adhesive thickness in manufacturing the layers that make up the sensor. In electrical circuitry, stray capacitance in measurement leads and semiconductor junction capacitance can lead to changes in value. Particularly with a digitized data collection mechanism, these errors can be partially canceled out through a calibration measurement that can be applied to each measurement made. Over time and environmental conditions, however, such initial calibration can become less accurate as values of junction capacitance vary and materials properties change slightly.

Providing a reference sensor having the same variations as the valve packing gland compression load sensor affords a normalizing correction for the sensor reading. One correction technique would be to divide each sensor measurement by the value of the reference sensor measurement. In such a manner, a 10% variation in the capacitive compression load sensor output caused by the aforementioned variables would result in an attendant 10% variation in the reference sensor output. The corresponding variations result in cancellation of the error. The reference sensor is positioned outside the packing gland compression area. Consequently, the reference sensor output would not change its value as the packing gland is compressed. Prior to applying compression to the packing gland, the measured values of capacitance of the reference sensor and the valve packing gland compression load sensors would be approximately equivalent to their relative plate areas. As compression of the packing gland occurs, the compression load sensors increase in capacitance due to the decrease in spacing distance, d, in the capacitance formula. The reference sensor value remains unchanged except for any change in material or circuit characteristics, and subsequently cancel out the error produced in the compression load sensor output produced by changes in the material and circuit characteristics.

Figure 13:
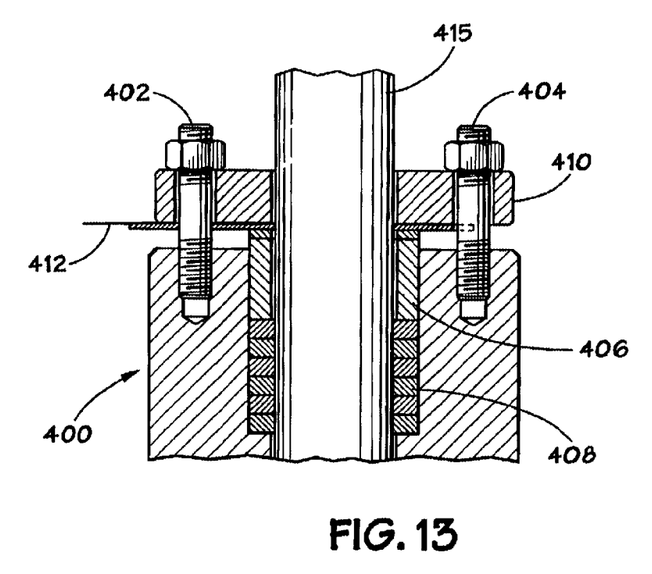
FIG. 13 illustrates a valve packing gland having a compression load sensor and a reference sensor.

FIG. 13 shows a valve packing gland configuration 400 wherein bolts 402 and 404 compress a follower 406. Follower 406 bears against and compresses packing gland layers 408. A plate 410 carries the compressive force applied by the bolts to the follower through packing gland compression load sensor 412. The valve stem 415 extends through the packing gland layers 408. The load sensor 412 has a load sensing portion that is within the area of compression transfer to the follower 406 and a reference sensor portion that is outside the periphery of the follower 406.

Figure 14:
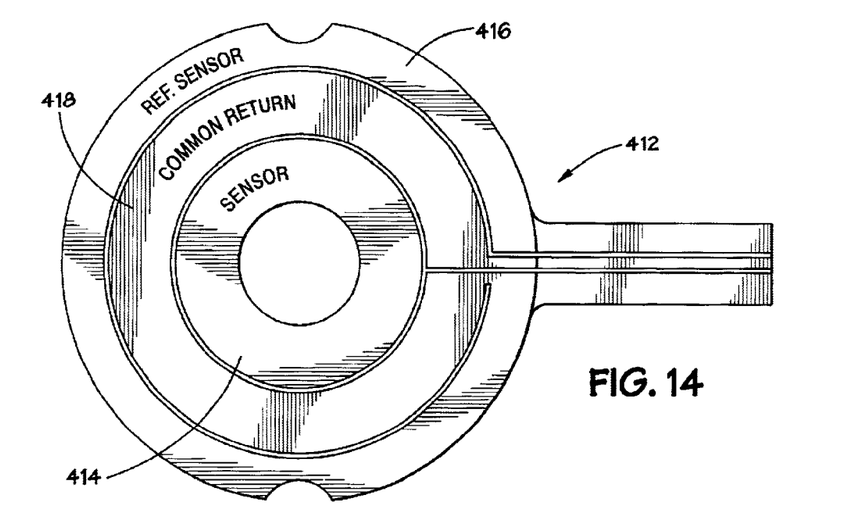
FIGS. 14, 15 and 16 illustrate the compression load sensor and a reference sensor used in FIG. 13.
Figure 15:
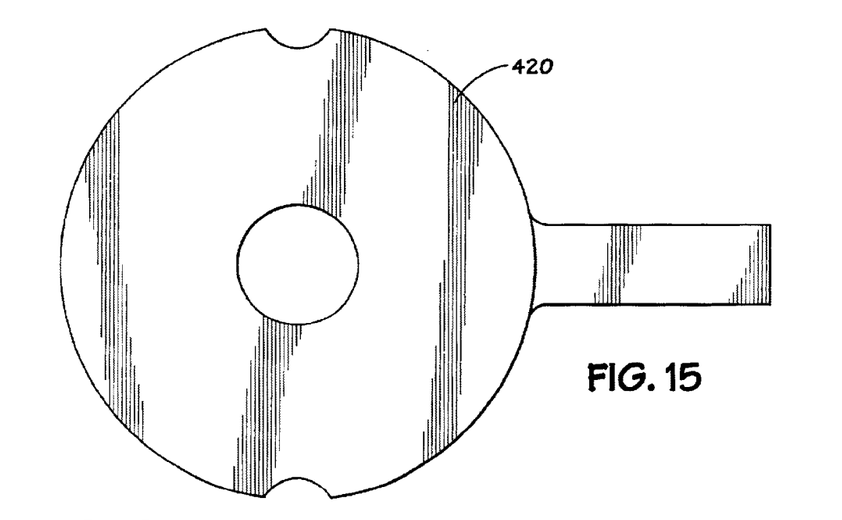

FIG. 14 shows the configuration of one side of the valve packing gland compression load sensor 412. The structure includes the load sensing portion 414, reference sensing portion 416, and common return 418 disposed between the portions 414 and 416. The portions 414 and 416 form one capacitor plate of the compression load sensor and the reference sensor, respectively. The other side of the valve packing gland compression load sensor 412 is a large metallized ring 420, which is shown in FIG. 15. The large metallized ring 420 is provided as a second capacitor plate. Disposed between the ring 420 and the load sensing portion, the reference sensing portion, and the common return is a dielectric layer (not shown). Thus, a capacitor is formed between each of the load sensing portion 414 and the metallized ring 420. Another capacitor is formed between the reference sensor portion 416 and the metallized ring 420. A further capacitor is formed between the common return area and the metallized ring 420. The arrangement results in a capacitance C1 for the load sensing portion in series with a capacitance C2 for the common return area. The capacitance C2 is not significant in the measurement of the capacitance C1 because the equivalent capacitance for two series connected capacitors is $1/C_T=1/C1+1/C2$. If one capacitance is much larger than the other, the value of $C_T$ is the other, smaller capacitance value.

Figure 16:
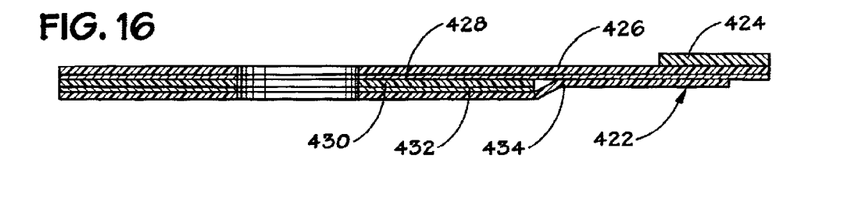

FIG. 16 further illustrates the valve packing gland compression load sensor construction in a side view showing the various layers. Tab connector 422 is on the right side. A stiffening member 424 is provided for rigidity. An insulator layer 426 (e.g., 0.002" polyamide or polyester) extends across the packing gland compression load sensor. A metallized layer 428 includes the load sensing portion 414, the common return area 418 and the reference sensing portion 416. The insulator layer carries the metallized areas and holds them in position. A dielectric layer 430 (e.g., 0.004" Teflon®) is disposed between the metallized layer 428 and a metallized layer 432 that forms the ring 420. A protective insulating layer 434 is placed adjacent the layer 420.

Figure 17:
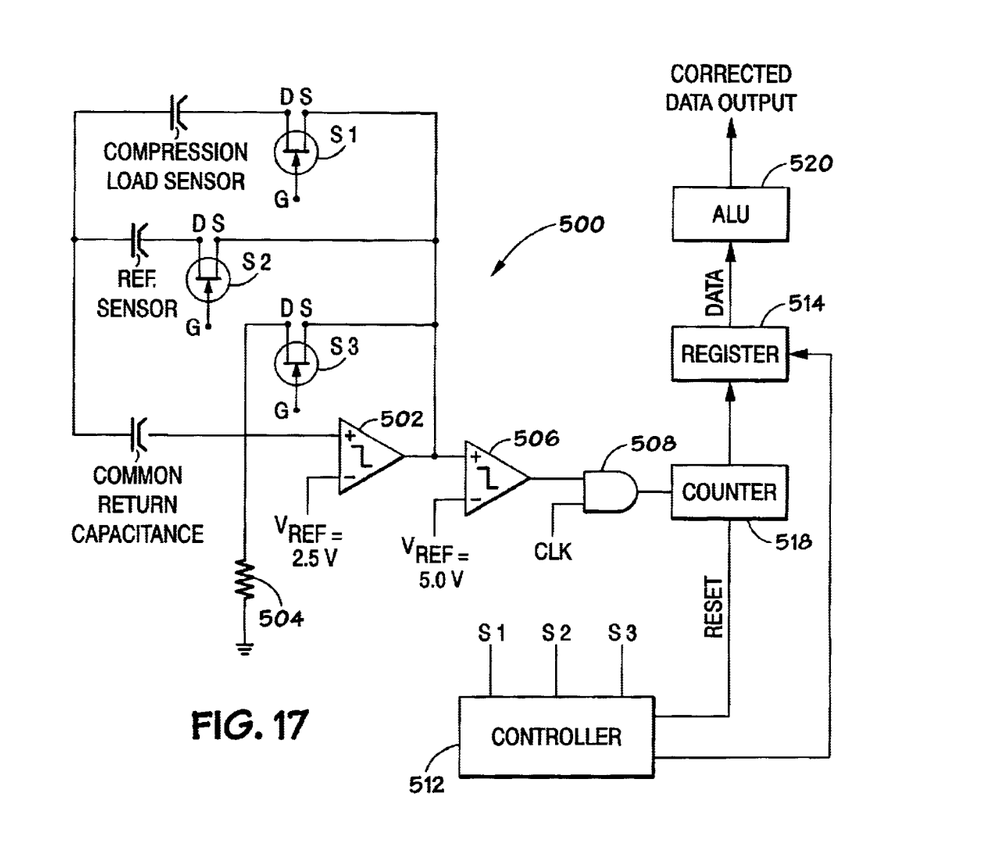
FIG. 17 illustrates a capacitance-measuring instrument for use with the compression load sensor and a reference sensor of FIG. 13 and including circuitry for correcting errors in the capacitive gasket compression sensor data.

FIG. 17 illustrates a capacitance measuring circuit for an arrangement of a capacitive compression load sensor and a reference sensor such as shown in FIGS. 14–16. Circuit 500 is shown connected to a capacitor identified as the compression load sensor and to a capacitor identified as the reference sensor. Also shown is the series connected capacitance provided by the common return. The load sensor capacitor and the reference sensor capacitor are connected in the feedback loop of an operational amplifier 502. Each of the load sensor capacitor and the reference sensor capacitor is connected in series with an FET switch identified, respectively, as S1 and S2. Another FET switch S3 is also connected in the feedback loop of operational amplifier 502. A resistor 504 is connected to the negative input of operational amplifier 502. The positive input of operational amplifier 502 is connected to a voltage reference source $V_{Ref}=2.5$ v. Resistor 504 provides a constant current input to operational amplifier 502 according to $I=V_{Ref}/R$. The output of operational amplifier 502 is applied to the negative input of threshold detector 506, which has its positive input connected to another reference voltage $V_{Ref}=5.0$ v. The output of the threshold detector 506 is provided as a gating input to And gate 508 to control the passing of clock pulses to counter 510. Controller 512 provides control inputs for the switches S1–3 and a reset control to the counter. Also, Controller 512 provides a control input to register 514 having the capacitance measurement data at its outputs. The Data available from register 514 is made available for display driver (not shown) or to data processing facility such as a personal computer.

Figure 18:
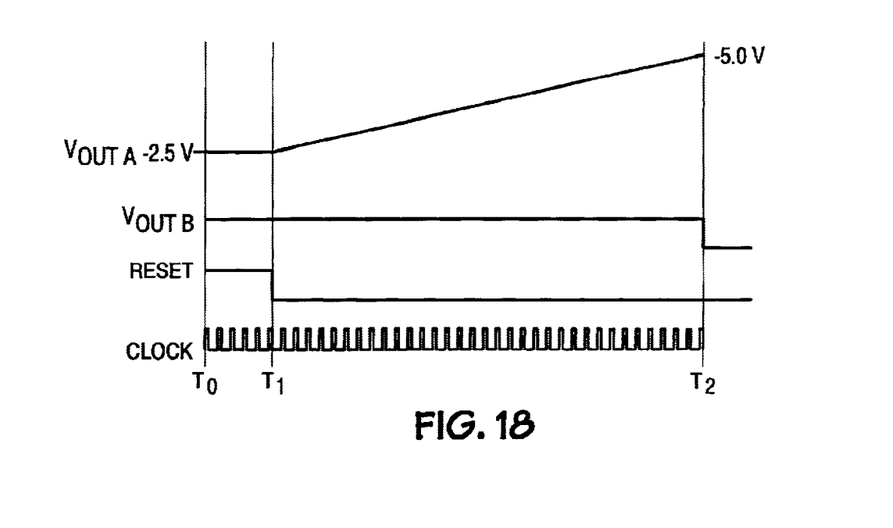
FIG. 18 illustrates a timing diagram explaining the operation of the circuitry of FIG. 17.

Operation of circuit 500 is illustrated by the timing diagram of FIG. 18. Switch S3 is closed prior to measurement. A measurement begins at T1 when S3 opens and one of the switches S1–2 is closed. The operational amplifier 502 acts as an integrator to provide an integral of its input at the output Volt A. Thus, the voltage at the output of operational amplifier 502 ramps toward an upper voltage limit in response to the constant current input. When Volt A reaches the voltage threshold of detector 506, the output Volt B has a transition from a high voltage to a low voltage. The voltage output levels correspond to logic levels used in digital circuits. During the time of the measurement, a clock is running to provide clock pulses to counter 518. However, when the detector 506 goes to a low logic level at T2, And gate 508 no longer gates clock pulses through to the counter. The amount of time that it takes for Volt A to reach the detection threshold of operational amplifier 506 is a function of the measured capacitance value of the compression load sensor. Consequently, the number of clocks counted and the count value in the counter is a function of the capacitance of the compression load sensor capacitor. The count value data is transferred to register 514 to be read as the capacitance measurement Data. The register may be configured to store measurement from both sensors or only one of the sensors. The Data is provided to a circuit 520 such as an arithmetic logic unit (ALU) to perform mathematical operations such as dividing the measured capacitance of the compression load sensor by the value of the reference sensor capacitance. The compression load sensor value then becomes a measurement that is free of errors from such sources as operational amplifier leakage current and parasitic capacitance. The ALU produces corrected capacitive valve packing gland compression load sensor output data.

Although specific embodiments of the invention have been set forth herein in some detail, it is to be understood that this has been done for the purposes of illustration only and is not to be taken as a limitation on the scope of the invention as defined in the appended claims and the breadth of the disclosure. It is to be understood that various alterations, substitutions, and modifications may be made to the embodiment described herein without departing from the spirit and scope of the invention as set forth in the appended claims.

What is claimed is:

1. A system for determining the compressive loading of a packing gland providing a seal around an elongate member inserted through a stuffing box, the packing gland being compressed by a source of applied force, comprising:

a load sensor for disposition between the packing gland and the source of applied force comprising:

a compressible inner layer having opposed generally flat faces on opposite sides and a central opening, said inner layer formed of dielectric material having a known dielectric constant;

an electrically conductive ring on a first one of the faces and surrounding the central opening;

an electrically conductive ring on the second, opposite face and surrounding the central opening;

a first outer layer of dielectric material having a central opening in registration with the central opening in the inner layer;

a second outer layer of dielectric material having a central opening in registration with the central opening in the inner layer; and a pair of conductors coupled to the electrically conductive rings on the faces of the inner layer; and a capacitance measuring instrument connectable to the load sensor conductors and producing a signal indicative of the measured capacitance between the electrically conductive rings as a function of the spacing between the rings; and a display coupled to the capacitance measuring instrument to receive the measured capacitance signal and provide a readout of the compressive loading on the packing gland.

2. The system of claim 1 wherein the load sensor further includes a connector comprising a tab at a peripheral edge of the inner layer and carrying the load sensor conductors.

3. The system of claim 1 wherein the electrically conductive ring on the first face of the inner layer of the load sensor is of a predetermined width so as to reside within an area of compression loading of the packing gland.

4. The system of claim 1 wherein the first face of the inner layer of the load sensor includes a second, outer electrically conductive ring surrounding the first ring.

5. The system of claim 1 wherein the inner ring has a width to reside within an area of compression loading of the packing gland and wherein the outer ring is radially spaced a distance from the inner ring to reside outside the area of compression loading of the packing gland.

6. The system of claim 5 wherein the ring on the second face is of a width that extends from a location proximate the central opening to a location proximate the peripheral edge, and wherein the outer ring on the first face together with the ring on the second face form a reference capacitance.

7. The system of claim 6 wherein the reference capacitance is electrically coupled in series with the capacitance formed between the inner ring on the first face and the second ring on the opposite second face.

8. The system of claim 1 wherein the display comprises a personal computer coupled to the capacitance measuring instrument using a universal serial bus interface.

9. The system of claim 8 wherein the personal computer is connectable to a data communication link.

10. The system of claim 1 wherein the display comprises a personal computer connectable to a data communications link for the transmission of valve packing gland integrity data.

11. The system of claim 10 further comprising a remote data center coupled to the data communications link for receiving data from the personal computer.

12. The system of claim 10 wherein the remote data center comprises:
   a network server interfaced to the communications link to receive a set of collected measures from the personal computer, the collected measures set comprising individual measures related to a particular valve packing gland and recorded by the personal computer;
   a database server coupled to the network server and storing the collected measures set into a valve packing gland integrity record for an individual valve packing gland;
   an application server coupled to the database server and analyzing the collected measures sets in the valve packing gland integrity record for the individual valve packing gland relative to one or more other collected measures sets stored in the database server for the individual valve packing gland to determine a valve packing status indicator.

13. The system of claim 12 wherein the application server includes a feedback module providing tiered feedback over a feedback communications link to field maintenance personnel concerning individual valve packing gland integrity comprising:
   at a first level of feedback, communicating an interpretation of the valve packing status indicator;
   at a second level of feedback, communicating a notification of a potential valve packing defect concern based on the valve packing status indicator to on-site field maintenance personnel;
   at a third level of feedback, communicating a notification of a potential valve packing defect concern based on the valve packing status indicator to maintenance personnel in local proximity to the individual valve packing; and
   at a fourth level of feedback, communicating a set of valve packing installation modification instructions based on the valve packing status indicator.

14. The system of claim 1 wherein the display comprises a personal computer that processes the measured capacitance signal to provide valve packing compression information.

15. The system of claim 14 wherein the personal computer includes software comprising:
   a software module providing a set of collected measures comprising individual measures related to a particular valve packing and recorded by the personal computer;
   a database storing the collected measures set into a valve packing integrity record for an individual valve packing;
   a software module analyzing the collected measures sets in the valve packing integrity record for the individual valve packing relative to one or more other collected measures sets stored in the database for the individual valve packing to determine a valve packing status indicator; and
   a feedback module providing feedback to field maintenance personnel concerning individual valve packing integrity, said feedback including communicating an interpretation of the valve packing status indicator, communicating a notification of a potential valve packing defect concern based on the valve packing status indicator; and communicating valve packing installation modification instructions based on the valve packing status indicator.

16. A compression load sensor for disposition between a packing gland providing a seal around an elongate member inserted through a stuffing box and a source of applied force compressing the packing gland, comprising:
   a compressible inner layer having opposed generally flat faces on opposite sides and a central opening, said inner layer formed of dielectric material having a known dielectric constant;
   an electrically conductive ring on a first one of the faces and surrounding the central opening;
   an electrically conductive ring on the second, opposite face and surrounding the central opening;
   a first outer layer of dielectric material having a central opening in registration with the central opening in the inner layer;
   a second outer layer of dielectric material having a central opening in registration with the central opening in the inner layer; and
   a pair of conductors coupled to the electrically conductive rings on the faces of the inner layer.

17. A system for determining the compressive loading of a packing gland providing a seal around an elongate member inserted through a stuffing box, the packing gland being compressed by a source of applied force, comprising:
   a load sensor for disposition between the packing gland and the source of applied force in the area of packing gland compression comprising a capacitor having:
      a compressible inner layer having opposed generally flat faces on opposite sides and a central opening, said inner layer formed of a dielectric material having a known dielectric constant;
      a first plate comprising an electrically conductive ring on a first one of the faces and surrounding the central opening;
      a second plate comprising an electrically conductive surface on the second, opposite face;

a first outer layer of dielectric material having a central opening in registration with the central opening in the inner layer; and
    a second outer layer of dielectric material having a central opening in registration with the central opening in the inner layer;
a reference sensor disposed outside the area of packing gland compression comprising a capacitor having:
    a first plate comprising an electrically conductive ring on the first one of the faces of the inner layer of the load sensor, the ring being radially displaced from the electrically conductive ring on the first one of the faces of the inner layer of the load sensor; and
    a second plate comprising the electrically conductive surface on the second, opposite face of the inner layer of the load sensor;
a first conductor coupled to the electrically conductive ring plate of the load sensor;
a second conductor coupled to the electrically conductive ring plate of the reference sensor;
a third conductor coupled to the electrically conductive surface plate on the second, opposite face of the inner layer;
a capacitance measuring instrument individually connectable to the load sensor and to the reference sensor, said capacitance measuring instrument producing an output indicative of the measured capacitance of the load sensor and of the measured capacitance of the reference sensor; and
a circuit coupled to the capacitance measuring instrument to receive the measurement output for the load sensor and the measurement output for the reference sensor, the circuit combining the outputs to produce corrected load sensor outputs.

* * * * *